US007910903B2

(12) United States Patent
Milne

(10) Patent No.: US 7,910,903 B2
(45) Date of Patent: Mar. 22, 2011

(54) OPTICAL SENSOR WITH A COUNTER FOR COUNTING ITEMS AND CONTROLLING A LIGHT SOURCE

(75) Inventor: Douglas L. Milne, Dundee (GB)

(73) Assignee: NCR Corporation, Duluth, GA (US)

( * ) Notice: Subject to any disclaimer, the term of this patent is extended or adjusted under 35 U.S.C. 154(b) by 322 days.

(21) Appl. No.: 12/337,996

(22) Filed: Dec. 18, 2008

(65) Prior Publication Data

US 2010/0155573 A1 Jun. 24, 2010

(51) Int. Cl.
*G06K 5/00* (2006.01)
*H01J 40/14* (2006.01)
*G06M 7/00* (2006.01)

(52) U.S. Cl. ................. 250/556; 250/214 R; 250/223 R

(58) Field of Classification Search ............... 250/559.4, 250/559.47, 221, 559.12, 559.13, 205, 223 R, 250/214 R, 556; 356/434, 433, 237.1, 239.1, 356/71, 73; 377/6, 8, 70, 71, 72, 73, 74, 377/130; 382/135, 321; 235/379, 475, 384; 226/20, 45
See application file for complete search history.

(56) References Cited

U.S. PATENT DOCUMENTS 4,352,013 A * 9/1982 Fasig et al. ................ 250/223 R
4,737,627 A * 4/1988 Hughes et al. ............ 250/223 R
7,049,572 B2 5/2006 Jespersen et al.

* cited by examiner

*Primary Examiner* — Que T Le
*Assistant Examiner* — Jennifer Bennett

(57) ABSTRACT

An optical sensor comprises: a light source located on one side of a transport path; a variable current drive, an optical receiver in communication with the variable current drive, and located on an opposite side of the transport path to the light source and aligned therewith to detect light output therefrom; and a memory coupled to the variable current drive. The variable current drive is suitable for energising the light source so that the light intensity from the light source increases with increasing current. The variable current drive includes (i) a drive circuit for applying a pulse of current to the light source, during which pulse the light source is energised; and (ii) a counter for increasing the amount of current applied by the drive circuit during a pulse of current. The memory may be arranged to store a value from the counter indicative of a number of media items present in the transport path.

12 Claims, 13 Drawing Sheets

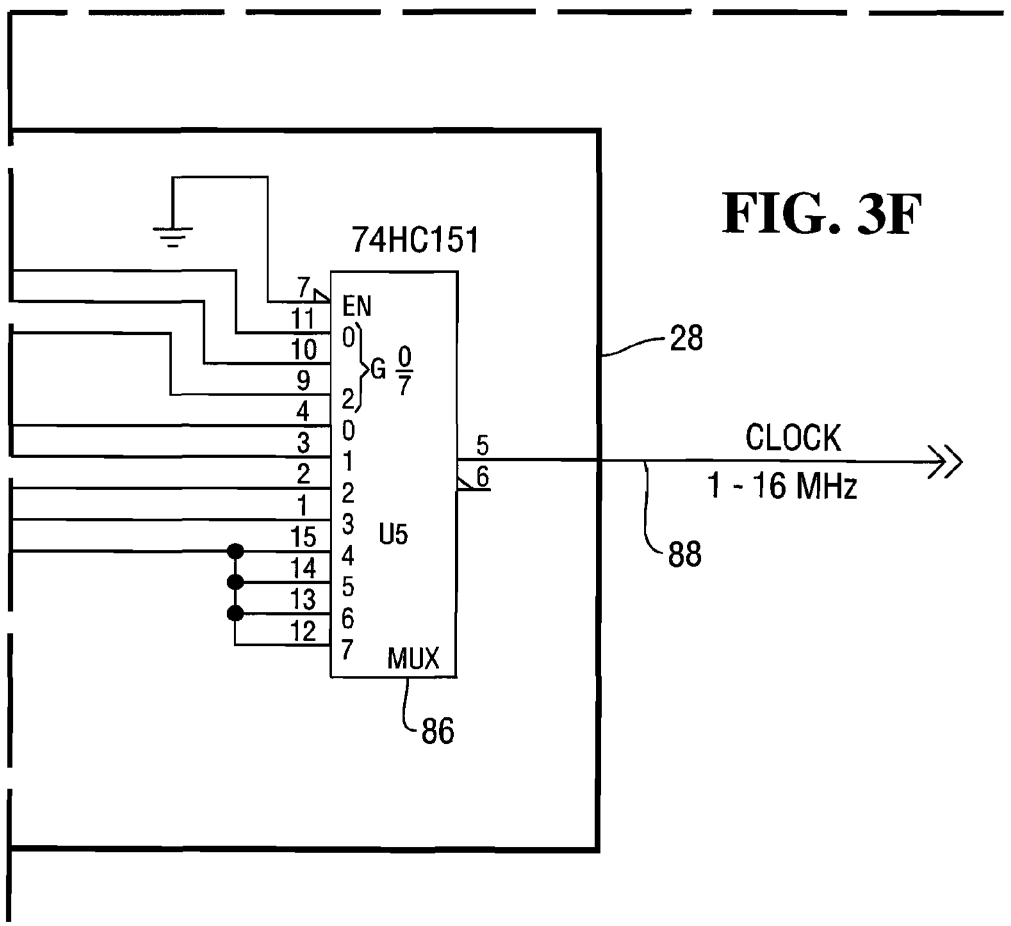
FIG. 3F
FIG. 3
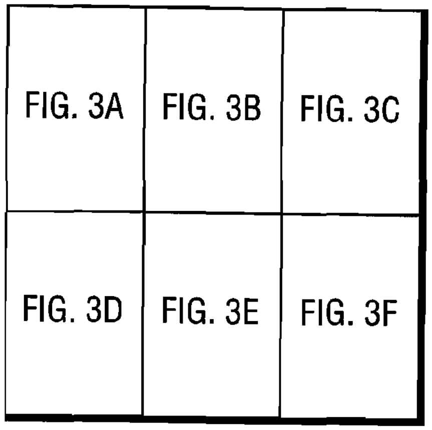

| | | |
|---|---|---|
| FIG. 4A | FIG. 4B | FIG. 4C |

OPTICAL SENSOR WITH A COUNTER FOR COUNTING ITEMS AND CONTROLLING A LIGHT SOURCE

FIELD OF INVENTION

The present invention relates to an optical sensor and a method of sensing media using an optical sensor.

BACKGROUND OF INVENTION

Optical sensors are commonly used for a variety of functions including detecting skewed or multiple picked media items within a media handler in a self-service terminal. One type of self-service terminal that relies on an accurate optical sensor is an Automated Teller Machine (ATM). An ATM typically includes a cash dispenser having a pick unit for picking individual banknotes and conveying these banknotes to a banknote transport mechanism for delivery to an ATM customer.

ATMs have used a variety of different optical and non-optical detectors to detect banknote skew and multiple picked banknotes. These sensors are sometimes referred to as note thickness sensors (NTS). One particular type of NTS relies on compensated opacity, and is described in U.S. Pat. No. 7,049,572.

The design of the NTS in U.S. Pat. No. 7,049,572 uses a variable intensity white light LED source and a co-operating phototransistor receiver. The source and receiver are located on opposing sides of a banknote transport path. The LED is driven by an increasing current until a pre-determined threshold is reached by the phototransistor, for example, 3.0V. When a banknote blocks the light path, the LED drive current is increased until the phototransistor output again reaches the pre-determined threshold. The greater the number of banknotes present, the greater the LED current required before the phototransistor receiver reaches the threshold. The current required to reach the threshold is used to ascertain the number of banknotes present.

This type of NTS relies on an analogue circuit to ensure that the sensor output is constant. One disadvantage of this arrangement is that a powerful light source (LED) is required that has a high energy consumption and requires expensive heat sinks. Furthermore, the spectral response of the LED changes as its temperature rises, leading to a reduction in output intensity for a fixed current. This means that the value of the drive current is not an accurate measure for ascertaining the number of banknotes present. This necessitates adding a further phototransistor receiver to detect the actual output intensity from the LED, and using this actual value to ascertain the number of banknotes present. This type of NTS is accordingly relatively expensive.

SUMMARY OF INVENTION

Accordingly, the invention generally provides methods, systems, and apparatus for an optical sensor.

In addition to the Summary of Invention provided above and the subject matter disclosed below in the Detailed Description, the following paragraphs of this section are intended to provide further basis for alternative claim language for possible use during prosecution of this application, if required. If this application is granted, some aspects of the invention may relate to claims added during prosecution of this application, other aspects may relate to claims deleted during prosecution, other aspects may relate to subject matter never claimed. Furthermore, the various aspects detailed hereinafter are independent of each other, except where stated otherwise. Any claim corresponding to one aspect should not be construed as incorporating any element or feature of the other aspects unless explicitly stated in that claim.

According to a first aspect there is provided an optical sensor comprising: a light source located on one side of a transport path; a variable current drive for energising the light source such that light intensity from the light source increases with increasing current, the variable current drive including (i) a drive circuit for applying a pulse of current to the light source, during which pulse the light source is energised; and (ii) a counter for increasing the amount of current applied by the drive circuit during a pulse of current; an optical receiver in communication with the variable current drive, and located on an opposite side of the transport path to the light source and aligned therewith to detect light output therefrom; and a memory coupled to the variable current drive and arranged to store a value from the counter indicative of a number of media items present in the transport path.

As used herein, a "light" source refers to any source of electro-magnetic radiation (at any convenient frequency on the electromagnetic spectrum), and is not limited to ultraviolet, visible, or infra-red radiation. For example, a light source includes a source of x-rays, radio waves, and the like.

The light source may comprise one or more light emitting diodes (LEDs). In one embodiment, one or more infra-red (IR) LEDs may be used.

By pulsing the light source, rather than using continuous illumination, thermal problems associated with the light source can be avoided or at least reduced.

The optical receiver may be a photodiode, a phototransistor, or any other convenient device.

The optical sensor may include a comparator for comparing light detected by the optical receiver with a detected light threshold, such that when an intensity of light equal to the detected light threshold is reached, the comparator changes state causing the variable drive circuit to terminate the pulse of current. The detected light threshold may be defined as a voltage, such as 3.0 V. The detected light threshold may be inversely proportional to the current applied by the drive circuit.

The counter may comprise a ripple counter, such as a 12-bit digital ripple counter.

The drive circuit may include a resistor ladder at the output of the counter so that a rising linear voltage is output from the resistor ladder as the counter value increases.

One of the bits (for example, the most significant bit) of the counter may be used as a saturation flag to indicate that the current cannot be increased any more. When the saturation flag is set, the drive circuit terminates the pulse so that the light source is not energised until the next pulse is applied.

The drive circuit may include a voltage to current converter for converting an output voltage from the resistor ladder to a current for driving the light source.

The optical sensor may include a controller. The controller may include the memory and may initiate the drive circuit. The controller may communicate with a remote media handler controller to convey the value from the counter indicative of a number of media items present in the transport path.

In one embodiment, a pulse may be applied to the light source periodically during passage of a media item. For example, the controller may initiate the drive circuit approximately every millisecond (1 ms) while the media item is present. The controller may initiate the drive circuit in response to a command received from the remote media handler controller.

Each media item of the same type typically has a very similar absorption characteristic. However, the total absorption of superimposed media items operates as an inverse square function, not a linear function, as illustrated in Table 1 below for a media item absorption characteristic of 50%.

TABLE 1

| Media items present | Percentage of light reaching sensor | Actual drive current | Desired drive current |
|---|---|---|---|
| 0 | 100 | x1 | x1 |
| 1 | 50 | x2 | x2 |
| 2 | 25 | X4 | x3 |
| 3 | 12.5 | X8 | x4 |

To achieve the desired drive current shown in column four of Table 1 above, in one embodiment, the amount of light to be detected by the optical receiver is reduced as the amount of light emitted by the light source is increased. One convenient way of implementing this is to use a differential amplifier coupled to the light source input and the comparator, so that an increasing input voltage at the light source is converted into a falling detected light threshold for the optical receiver. This has the effect that as more light is generated by the light source (indicating that multiple media items may be present), less light is required at the optical receiver to meet the detected light threshold. By selecting appropriate values of resistors for the differential amplifier, a linear relationship between media items and current can be achieved.

The variable current drive may further comprise a variable clock so that a slow clock rate is used when the counter value is low, and increases as the counter value increases. This reduces the effect of latency within the optical receiver because the light source emission is only increased relatively slowly at low counts. Low cost optical receivers typically have a latency of two to three microseconds when operating at the lowest 10% of their optical detection characteristics. This means that the optical receiver may not detect the threshold being reached until several microseconds after the threshold should have been reached. This has the effect of a null value (value of the counter when no media item is present) being too high.

In one embodiment, a variable clock may be implemented by a four bit counter having an input from a fixed clock output. The fixed clock output and the four outputs from the four bit counter may be input to a multiplexer, and outputs from the counter may be used to control the multiplexer. This can be used to ensure that once the counter reaches a predetermined value (for example, half-way) a full speed clock is used thereafter. The highest clock rates may only be required when highly opaque media items are used, or when more than three media items (for example, banknotes) are transported together.

According to a second aspect there is provided a self-service terminal comprising: the optical sensor of the first aspect incorporated within a pick unit of the terminal; and a non-optical sensor located in a transport path so that a number of media items picked by the pick unit is ascertained by the optical sensor and the number of media items picked by the pick unit is validated by the non-optical sensor.

The non-optical sensor may be a Hall effect sensor, a strain gauge, a linear variable differential transducer (LVDT), or the like.

By using an optical sensor, media items having transparent tape can be accurately counted; by using a non-optical sensor, media items having dirt thereon can be accurately counted; by using both an optical and a non-optical sensor, a more accurate determination of media items can be made, even if they are contaminated with dirt or transparent tape.

The self-service terminal may be an automated teller machine (ATM), an information kiosk, a financial services centre, a bill payment kiosk, a lottery kiosk, a postal services machine, a check-in and/or check-out terminal such as those used in the hotel, car rental, healthcare, gaming, and airline industries, a retail self-checkout terminal, a vending machine, or the like.

According to a third aspect there is provided a method of sensing media using an optical sensor, the method comprising: applying a pulse of current to a light source to energise the light source; incrementing a counter while the pulse is being applied to increase the amplitude of the current delivered by the pulse; detecting an intensity of light received by an optical receiver separated from the light source by one or more media items in a transport path; comparing the detected intensity with a threshold; halting incrementing of the counter when the detected intensity reaches the threshold; and ascertaining a number of media items present in the transport path based on the value of the counter when halted.

The method may comprise the further step of decrementing the threshold when incrementing the counter.

The step of incrementing the counter may be implemented using a variable clock, so that as the counter increases the clock rate increases. The clock rate may be continuously variable. Alternatively, there may be two, four, eight, or more different clock rates.

These and other aspects will be apparent from the following specific description, given by way of example, with reference to the accompanying drawings.

DETAILED DESCRIPTION

Figure 1:
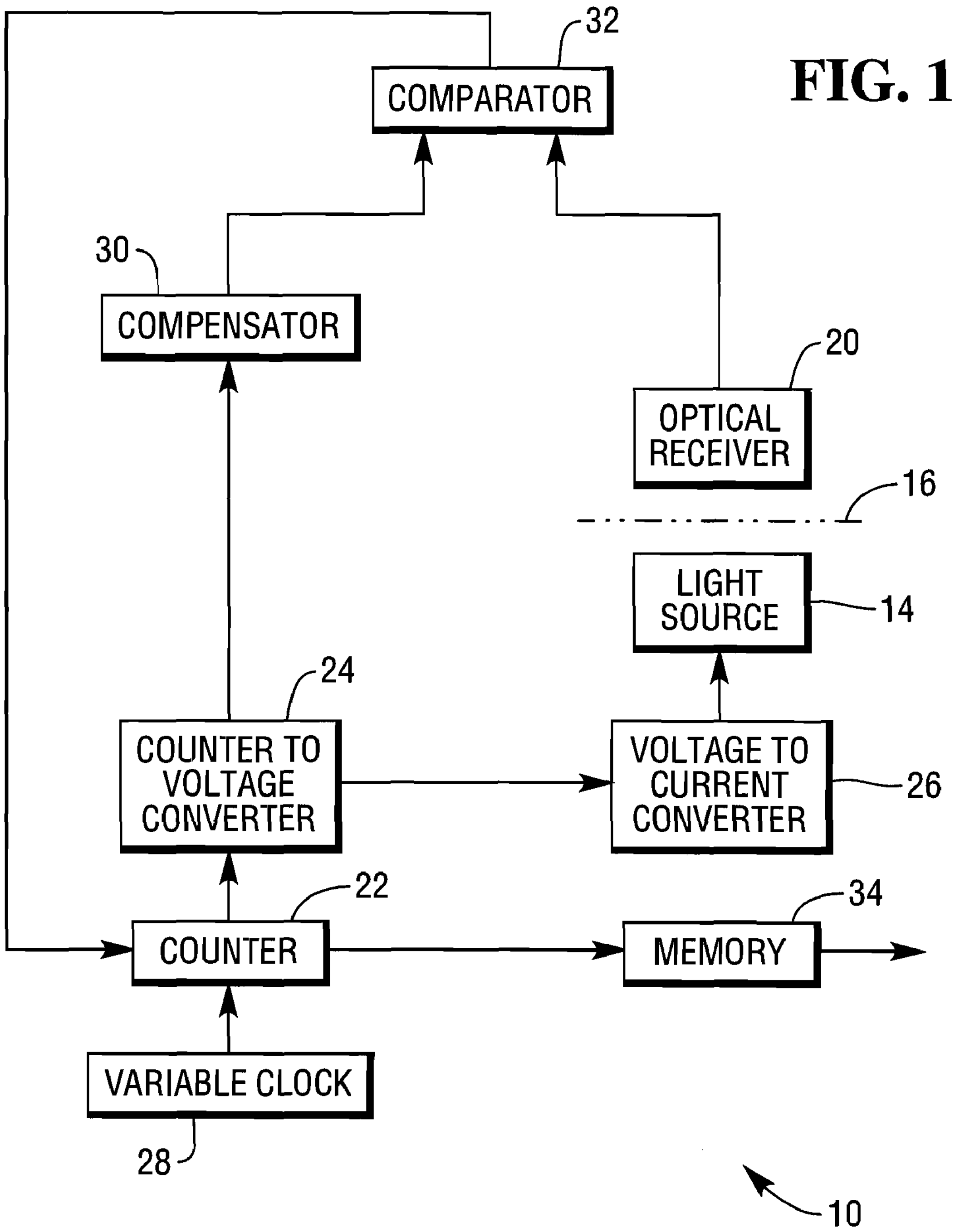
FIG. 1 is a block diagram of an optical sensor according to one embodiment of the present invention.

Reference is first made to FIG. 1, which is a block diagram of an optical sensor 10 according to one embodiment of the present invention.

The optical sensor 10 has a light source 14 in the form of a low cost infra-red (IR) light emitting diode (LED). The IR LED 14 is located on one side of a transport path (indicated by chain line 16). On an opposite side of the transport path 16 is an optical receiver 20 in the form of a photodiode. The photodiode 20 is aligned with the IR LED 14 to detect emission therefrom. A digital counter 22 is coupled to a counter to voltage converter 24, which is coupled to a voltage to current converter 26, which in turn drives the IR LED 14.

The digital counter 22 is regulated by a variable clock 28, having a low frequency (for example, 1 MHz) at relatively low counts of the counter 22 and a high frequency (for example, 32 MHz) at relatively high counts of the counter 22. The counter to voltage converter 24 is also coupled to a compensator 30.

The compensator 30 generates a reducing output voltage in response to an increasing voltage on its input (from the counter to voltage converter 24).

The output form the counter to voltage converter 24 (via compensator 30) and the output from the photodiode 20 are input to a comparator 32. When the inputs are equal, the comparator 32 signals the digital counter 22 to stop counting and to transfer the current value of the count to a memory 34.

The memory 34 is coupled to a remote controller (not shown) that ascertains the number of media items present based on the value of the counter 22.

Figure 4A:
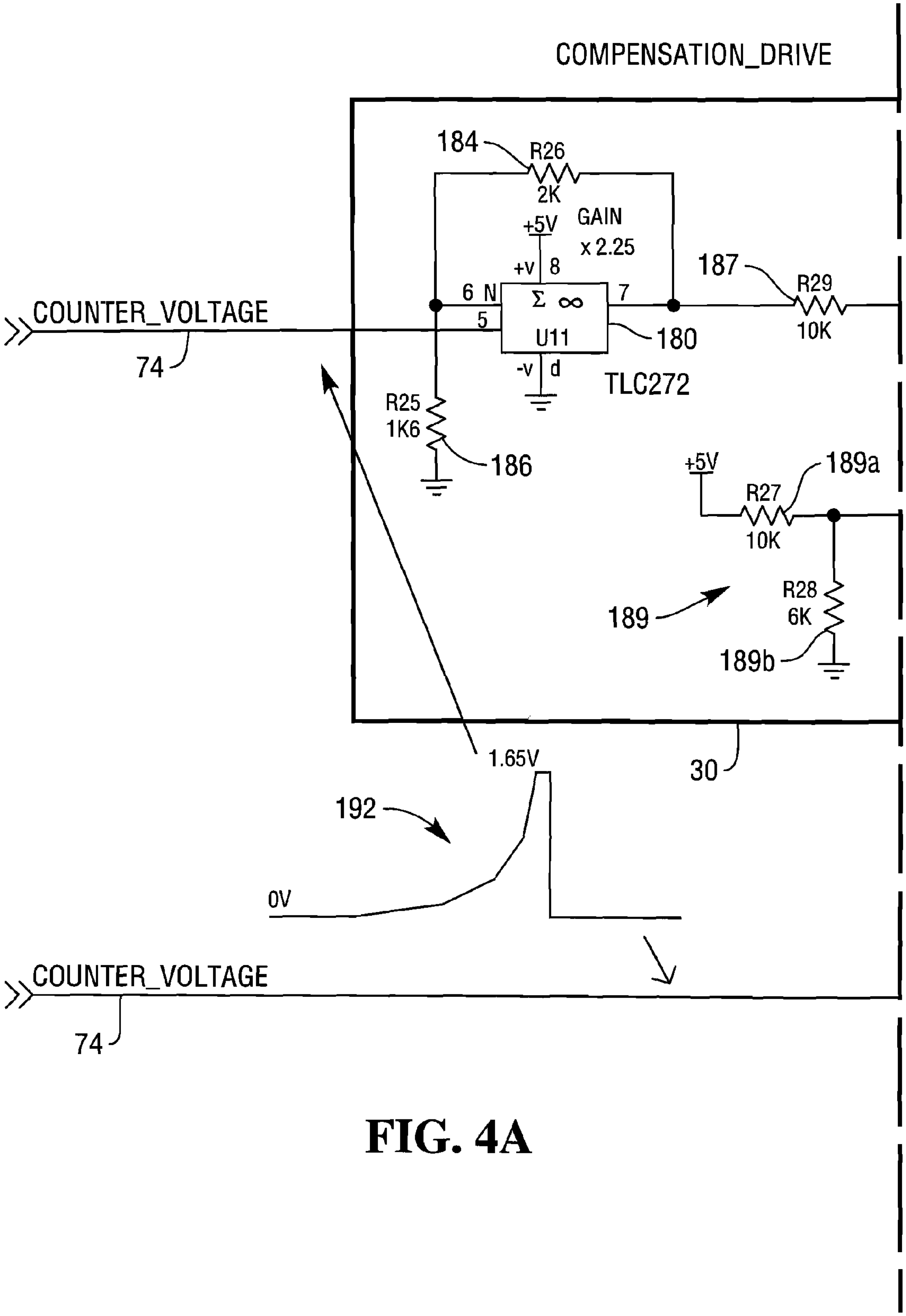
Figure 4B:
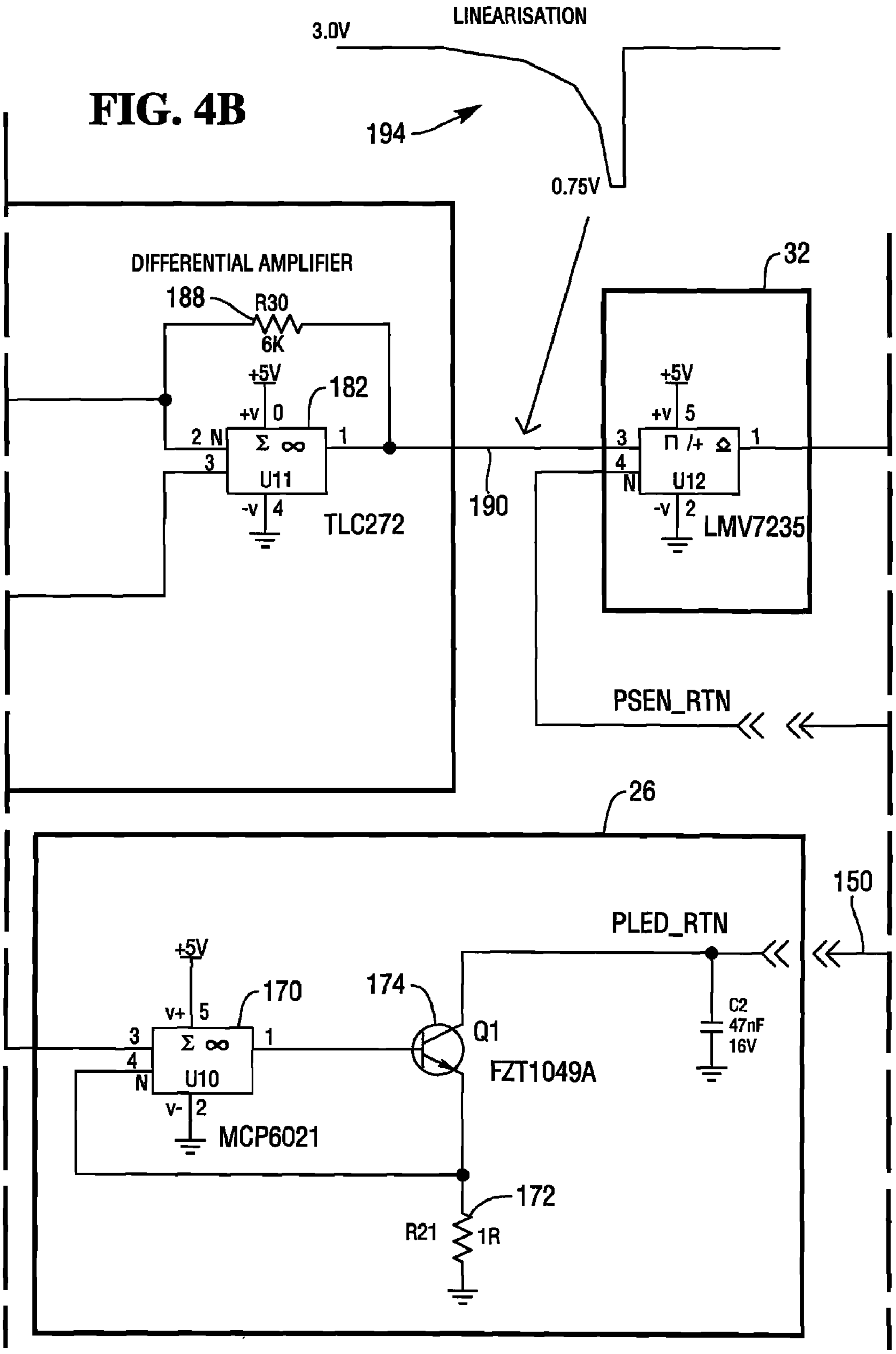
Figures 4, 4C:
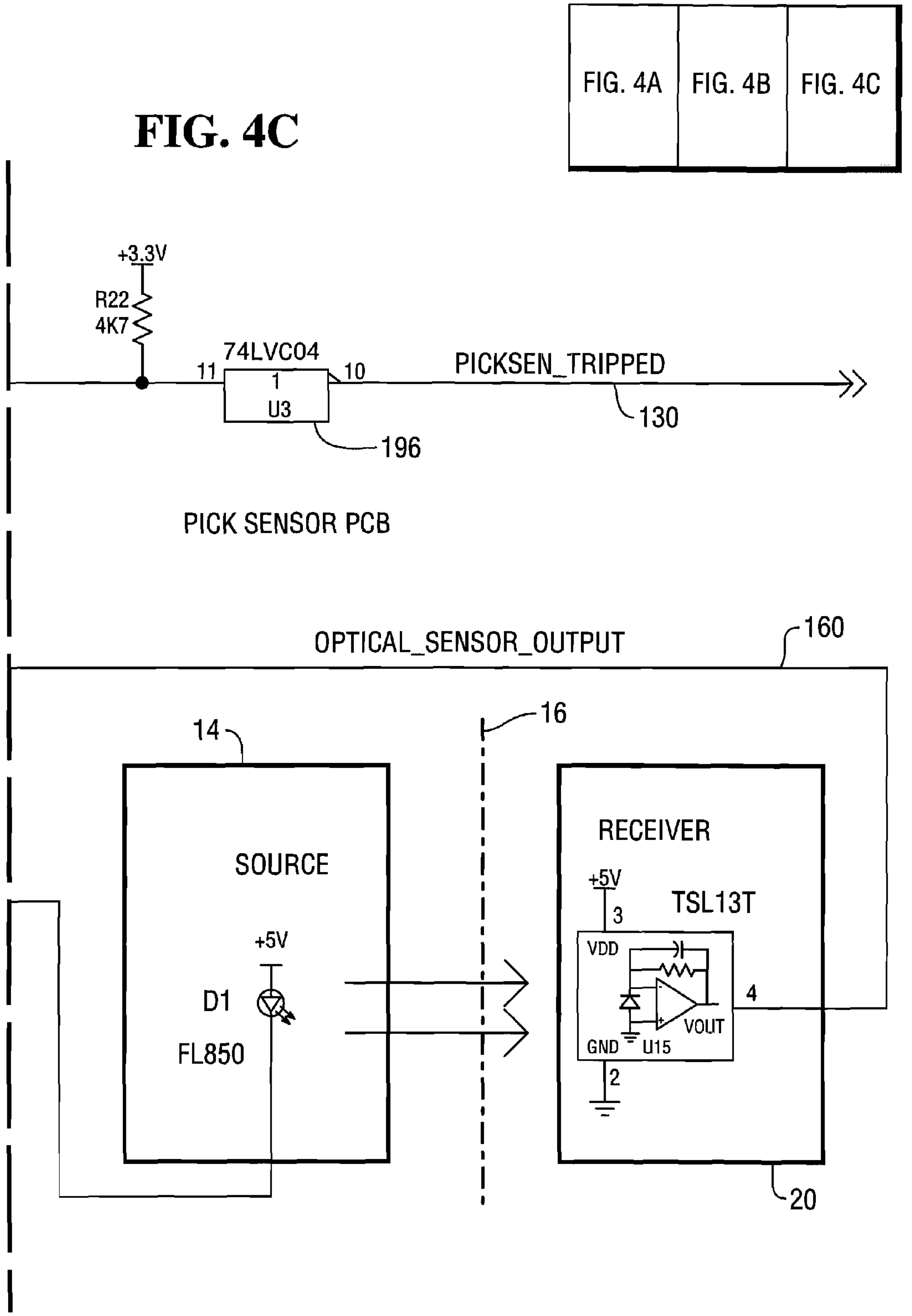

The operation of the optical sensor 10 will now be described in more detail with reference to FIGS. 2 to 4, which combine to form a schematic diagram of one implementation of the optical sensor. Those of skill in the art will recognise that the functional blocks 14 to 34 above may be implemented in a variety of different ways. The specific description provided below with reference to FIGS. 2 to 4 provides detailed component types and values, but these are given for exemplary purposes only.

Figure 2A:
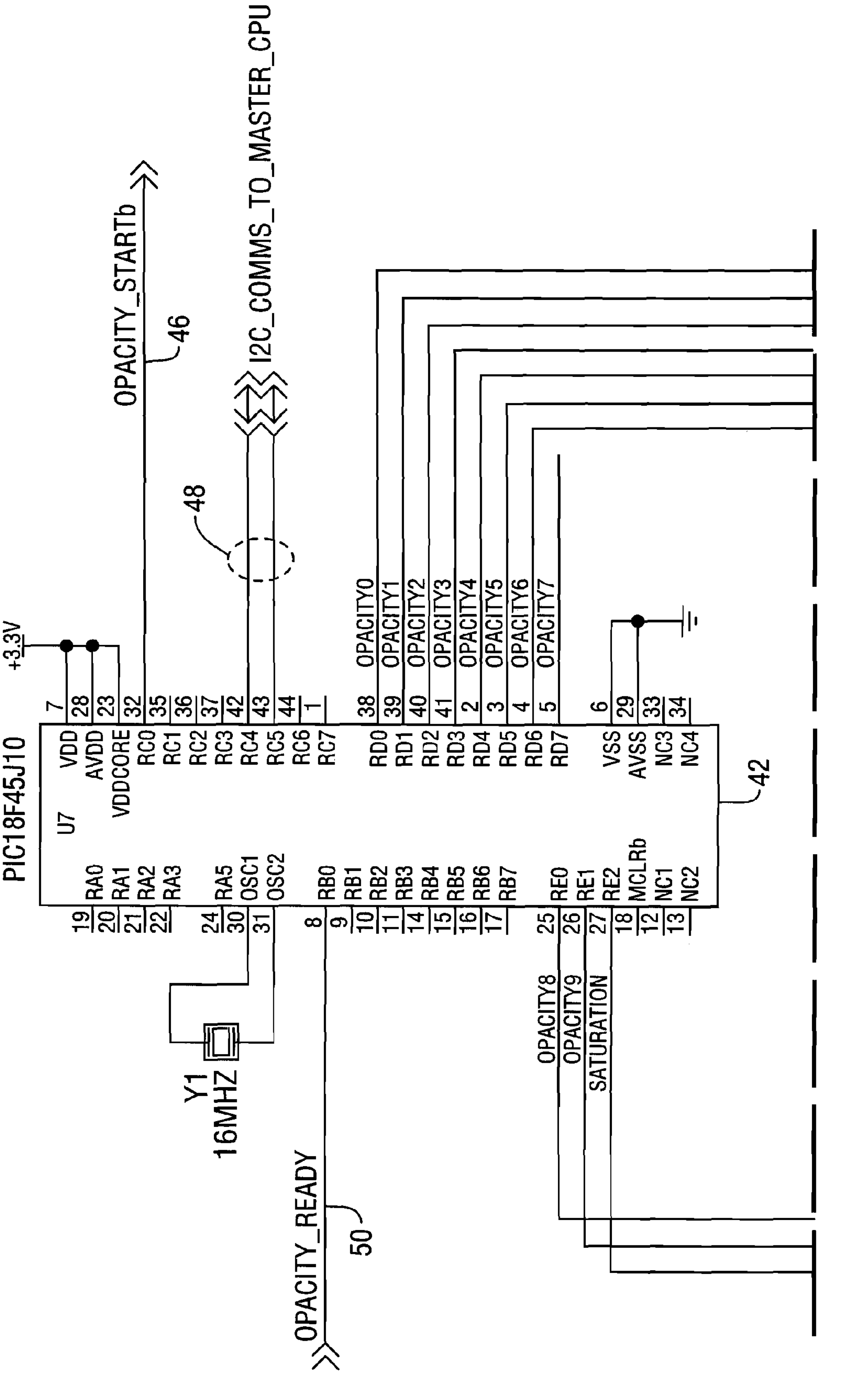
FIGS. 2 to 4 form, when combined, a schematic diagram of one specific implementation of the block diagram of FIG. 1.
Figure 2B:
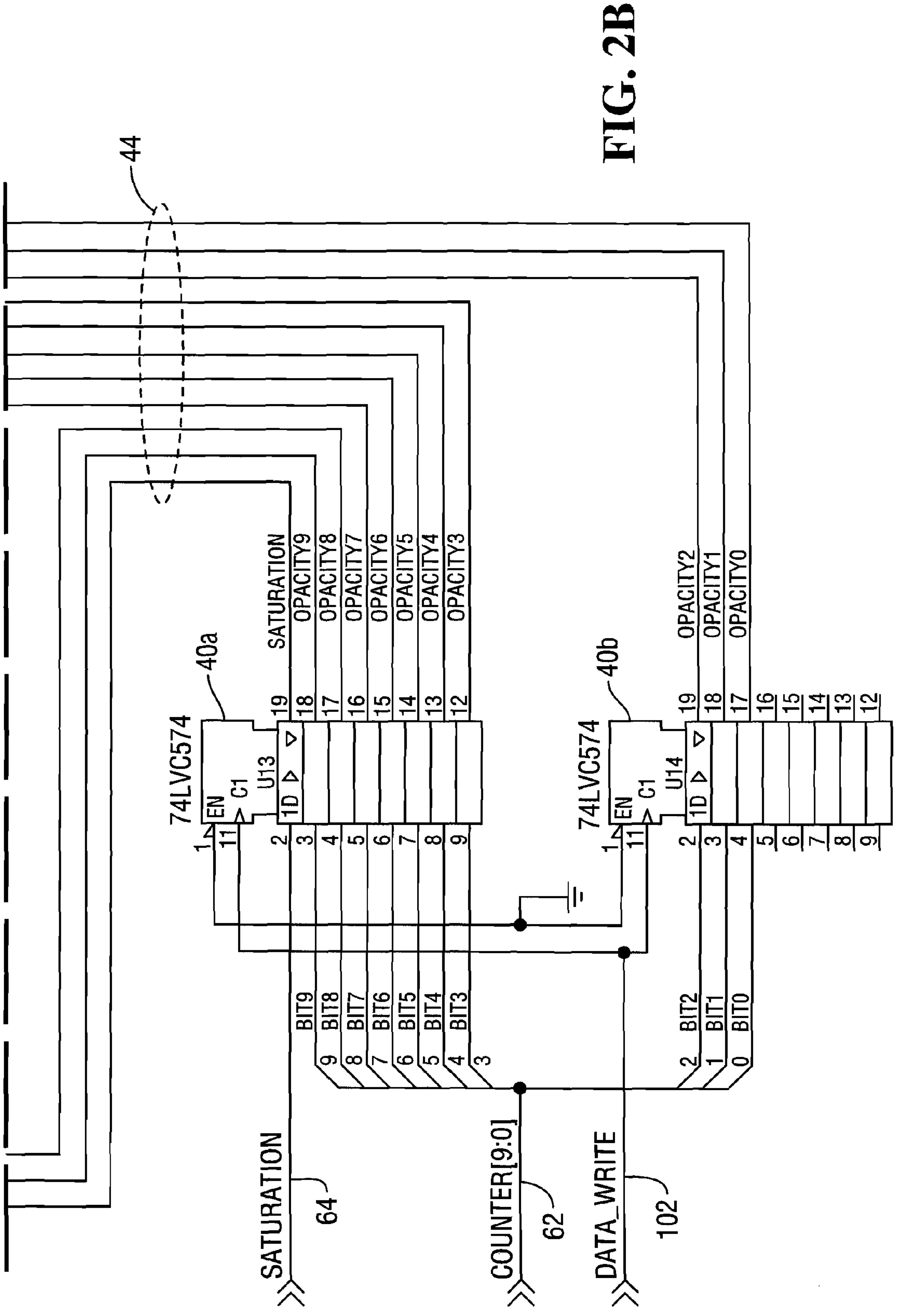
Figure 3A:
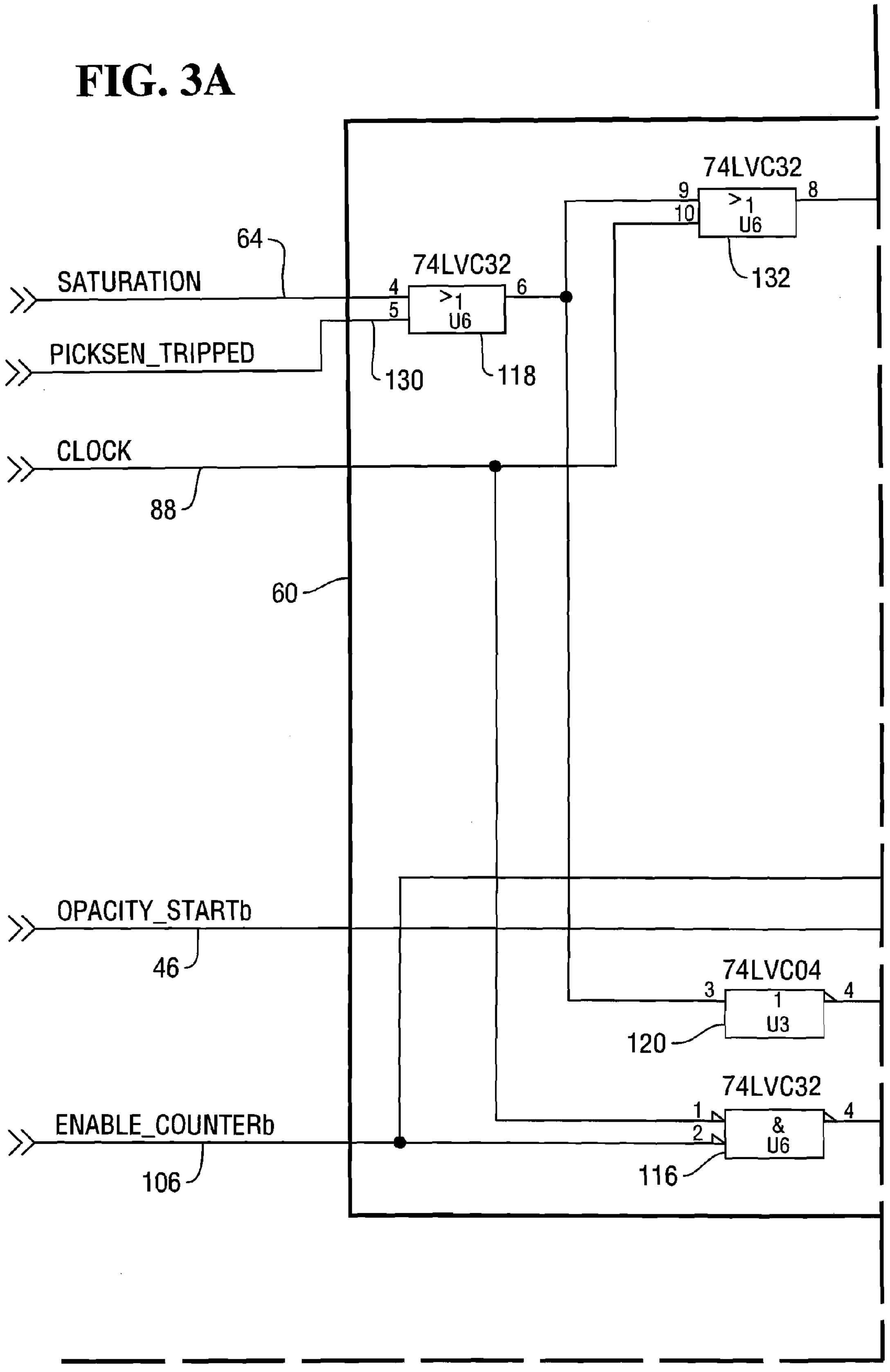
Figure 3B:
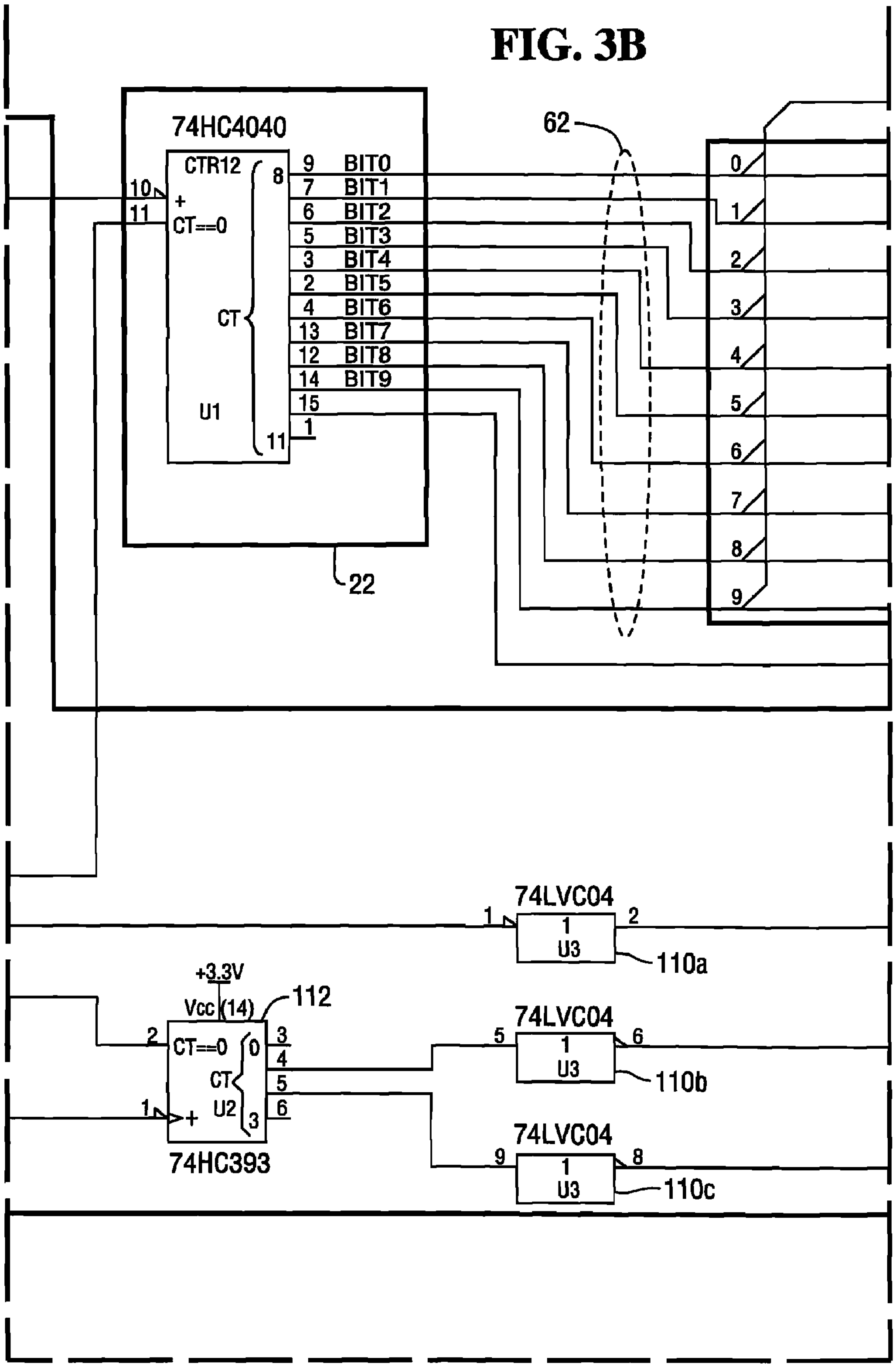
Figure 3C:
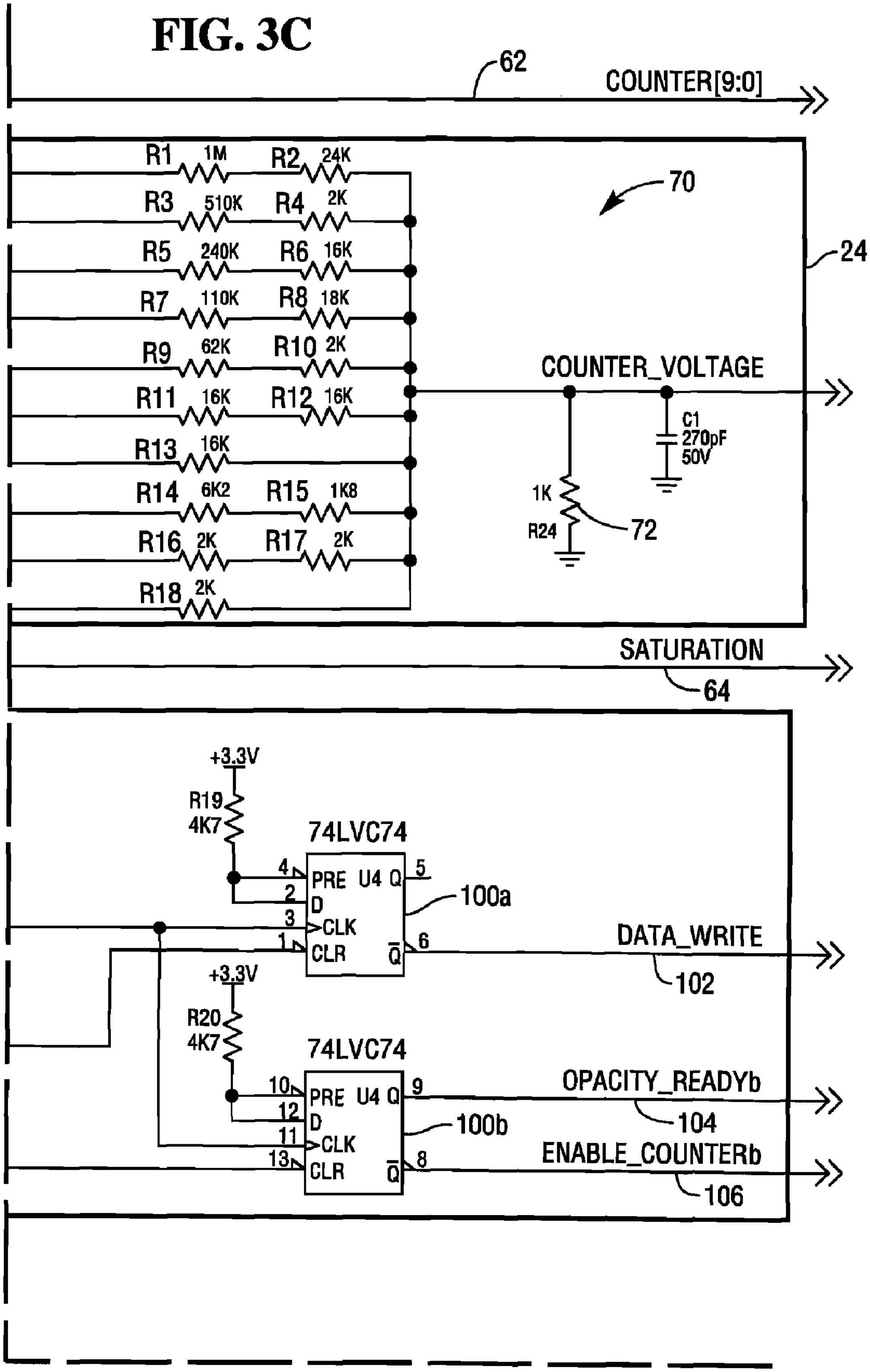
Figure 3D:
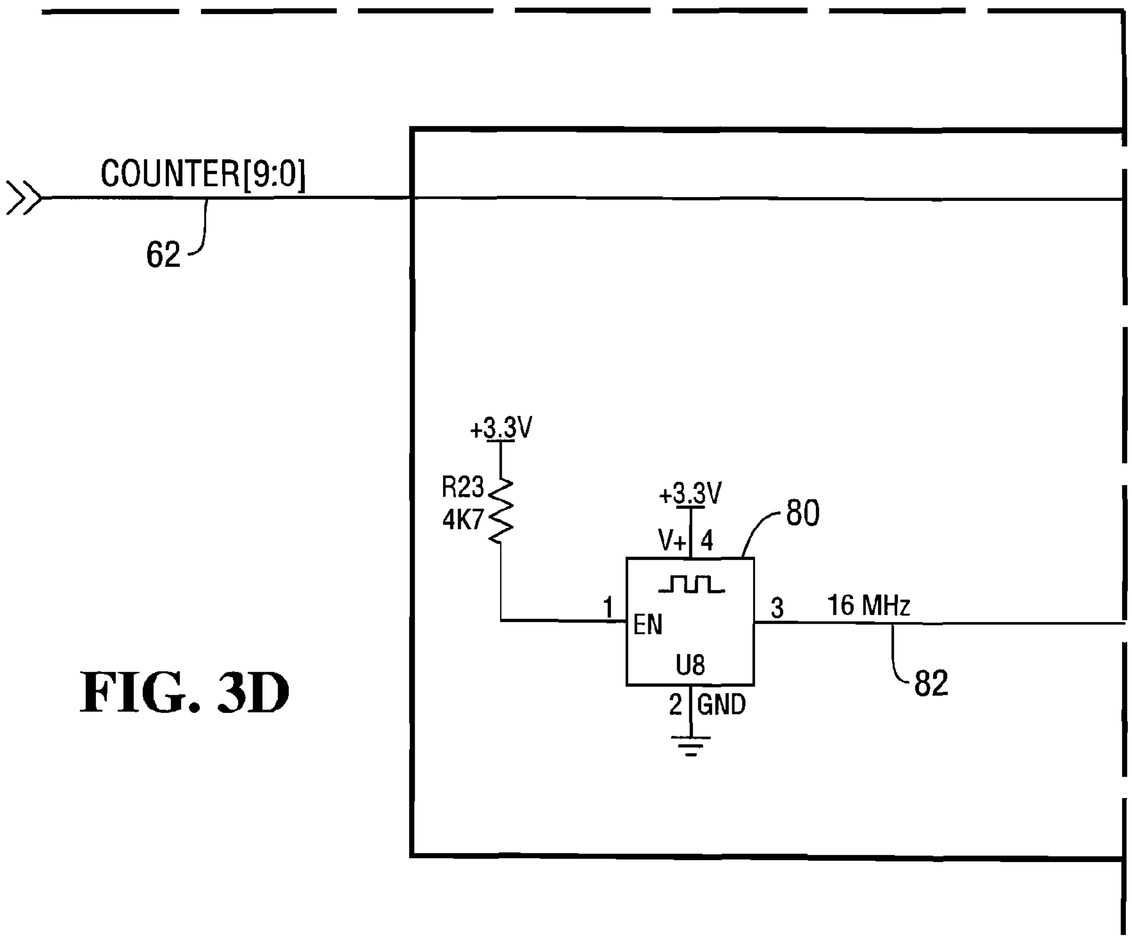
Figure 3E:
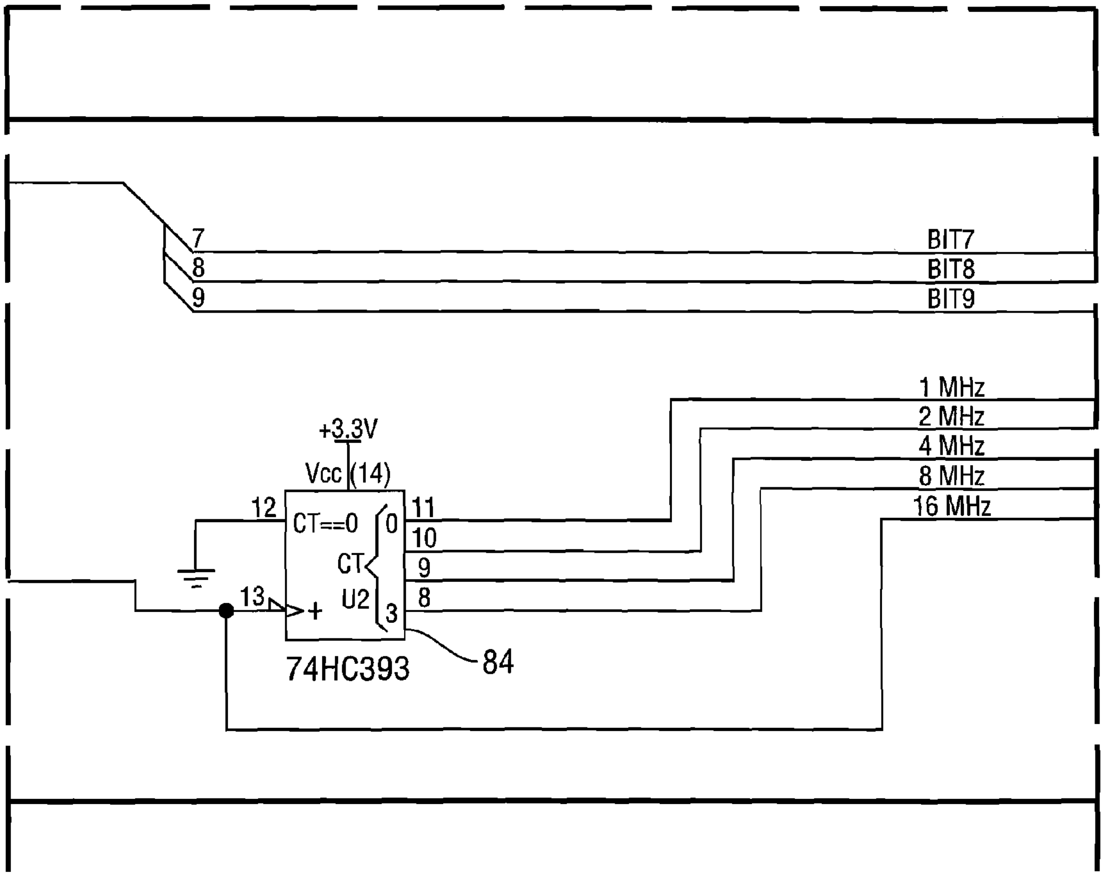

FIG. 2 illustrates the memory 34 in more detail. In FIG. 2, a pair of flip-flop circuits (part type 74LVC574) 40*a,b* are provided for latching a highest value reached by the counter 22. The outputs of the flip-flop circuits 40 (the highest counter value) are read into a controller 42 (part type PIC18F45J10) via a data bus 44.

The controller 42 initiates the counter 22 via an opacity_start connection 46, and when the count has been completed (described below) transfers the highest counter value to the remote controller (not shown) via a pair of connectors 48. The controller 42 has an opacity_ready input 50, via which the controller 42 receives a signal indicating that the contents of the flip-flop circuits 40 should be read into the controller 42.

FIG. 3 illustrates the counter 22, the counter to voltage converter 24, the variable clock 28, and control circuitry 60.

The counter 22 is a digital counter in the form of a 12-bit counter (part type 74HC4040). The lowest ten significant bits of the output of the counter 22 are output on a counter bus 62 to the counter to voltage converter 24, the next (eleventh) significant bit is output as a saturation connection 64.

The counter to voltage converter 24 comprises a resistor ladder 70, each step having half the resistance of the previous step, starting from 1024 kΩ and finishing at 2 kΩ. A 1 kΩ resistor 72 is included to provide a potential divider and ensure that the maximum output voltage at a counter_voltage output connection 74 is half of the supply voltage. A 3.3V supply is used in this embodiment, ensuring that the maximum voltage at the counter_voltage output connection 74 is approximately 1.65V.

The variable clock 28 is implemented using a fixed frequency clock 80 (in this embodiment oscillating at 16 MHz) having an output 82 that is coupled to a 4-bit counter (part type 74HC393) 84. The four outputs from the 4-bit counter 84 are input to four of the inputs (respectively) of an 8-input multiplexer (part type 74HC151) 86. The fixed clock output 82 is also input to the remaining four inputs of the multiplexer 86. The multiplexer output 88 is used as a variable clock for the control circuitry 60. The three selection lines of the multiplexer 86 are controlled by the three most significant bits of the counter bus 62. This ensures that as the counter 22 increments a higher clock rate is provided at the variable clock output 88, as illustrated in Table 2 below.

TABLE 2

Clock Rate for a given Count Value

| Count Range (hexadecimal) | Count Range (decimal) | Clock Rate |
|---|---|---|
| 000-07FH | 0-127 | 1 MHz |
| 080-0FFH | 128-255 | 2 MHz |
| 100-17FH | 256-383 | 4 MHz |
| 180-1FFH | 384-511 | 8 MHz |
| 200-3FFH | 512-1023 | 16 MHz |

The control circuitry 60 includes two flip-flops 100*a,b* (implemented as a single component, part type 74LVC74). The first flip-flop 100*a* has a data_write connection 102 coupled to the flip-flop circuits 40 of FIG. 2 to indicate that those flip-flop circuits 40 should read in the present value on the counter bus 62. The second flip-flop 100*b* has an opacity_ready connection 104 and an enable_counter connection 106. The inputs to the flip-flops 100 are provided by outputs from three inverters 110*a,b,c* (part type 74LVC04). A 4-bit binary counter 112 (part type 74HC393) is provided as a delay circuit to ensure there is sufficient time to transfer the value on the counter bus 62 through the flip-flop circuits 40 (FIG. 2) and into the controller 42 (FIG. 2). The 4-bit binary counter 112 has a count increment connection 114 coupled to an output from a 2-input OR gate 116 (part type 74LVC32). The OR gate 116 has an input from the enable_counter connection 106 and an input from the variable clock connection 88. Another 2-input OR gate 118 has an input from the saturation connection 64 and an input from a picksen-tripped connection 130. The output from the OR gate 118 goes to an inverter 120 (having an output connecting to the 4-bit binary counter 112) and another 2-input OR gate 132. The 2-input OR gate 122 also has an input from the variable clock connection 88. The output from the 2-input OR gate 132 is connected to the digital counter 22.

FIG. 4 illustrates the light source 14, the optical receiver 20, the voltage to current converter 26, the compensator 30, and the comparator 32.

The light source 14 comprises a high power AlGaAs infrared LED (part type FL850). The light source 14 is powered by current on a pled_rtn connection 150, and emits light in proportion to the applied current.

The optical receiver 20 is a light-to-voltage converter combining a photodiode and a transimpedance amplifier (part type TSL13T). The optical receiver 20 outputs a voltage on an optical_sensor_output connection 160, which is proportional to the intensity of light detected by the optical receiver 20.

The voltage to current converter 26 includes an operational amplifier 170 (part type MCP6021) having one input coupled to the counter_voltage connection 74 and the other input coupled to ground via a series resistor 172. The output of the operational amplifier 170 controls a transistor 174. As the voltage on the counter_voltage connection 74 increases, the voltage across the series resistor 172 also increases, and the voltage drop across the transistor 174 decreases, causing a proportional increase in the current through the light source 14.

The compensator 30 comprises an operational amplifier 180 (part type TLC272) configured as a non-inverting amplifier (a gain stage) which is coupled to another operational amplifier 182 (implemented on the same component) configured as a differential amplifier. The non-inverting amplifier 180 includes a feedback resistor 184 (having a value of 2 kΩ) and a series resistor 186 (having a value of 1600Ω) coupling one the inputs to earth. This provides a voltage gain of approximately 2.25.

A series resistor ($R_S$) 187 (having a value of 10 kΩ) connects the non-inverting amplifier 180 to the differential amplifier 182. This is the $V_{IN}-$ input to the differential amplifier 182. The differential amplifier 182 includes a feedback resistor ($R_F$) 188 (having a value of 6 kΩ), and a potential divider 189 comprising a resistor 189*a* (having a value of 10 kΩ) coupled to a power supply (5V) (this is the $V_{IN}+$ input to the differential amplifier 182) and a resistor 189*b* (having a value of 6 kΩ) coupled to earth. Since resistor 189*a* has the same value of resistance as series resistor 187, and feedback resistor 188 has the same value of resistance as resistor 189*b*, the output ($V_O$) of the differential amplifier will be $$V_O=(V_{IN}+)-(V_{IN}-)*(R_F/R_S),$$

or $$V_O=(V_{IN}+)-(V_{IN}-)*0.6$$

The differential amplifier 182 provides an output on a compensation_output connection 190.

As the voltage on the counter_voltage output connection 74 rises from 0V to 1.65V (shown as drawing 192 on FIG. 4), the voltage on the compensation_output connection 190 falls from 3V to 0.75V (shown as drawing 194 on FIG. 4). This ensures that as a higher current is required at the light source 14, a lower voltage on the optical_sensor_output 160 is required for the comparator 32 to change state.

The comparator 32 (part type LMV7235) compares an input from the optical_sensor_output connection 160 with an input from the compensation_output connection 190. The output of the comparator 32 passes through an inverter 196 and is output therefrom as the picksen_tripped connection 130.

Figure 5:
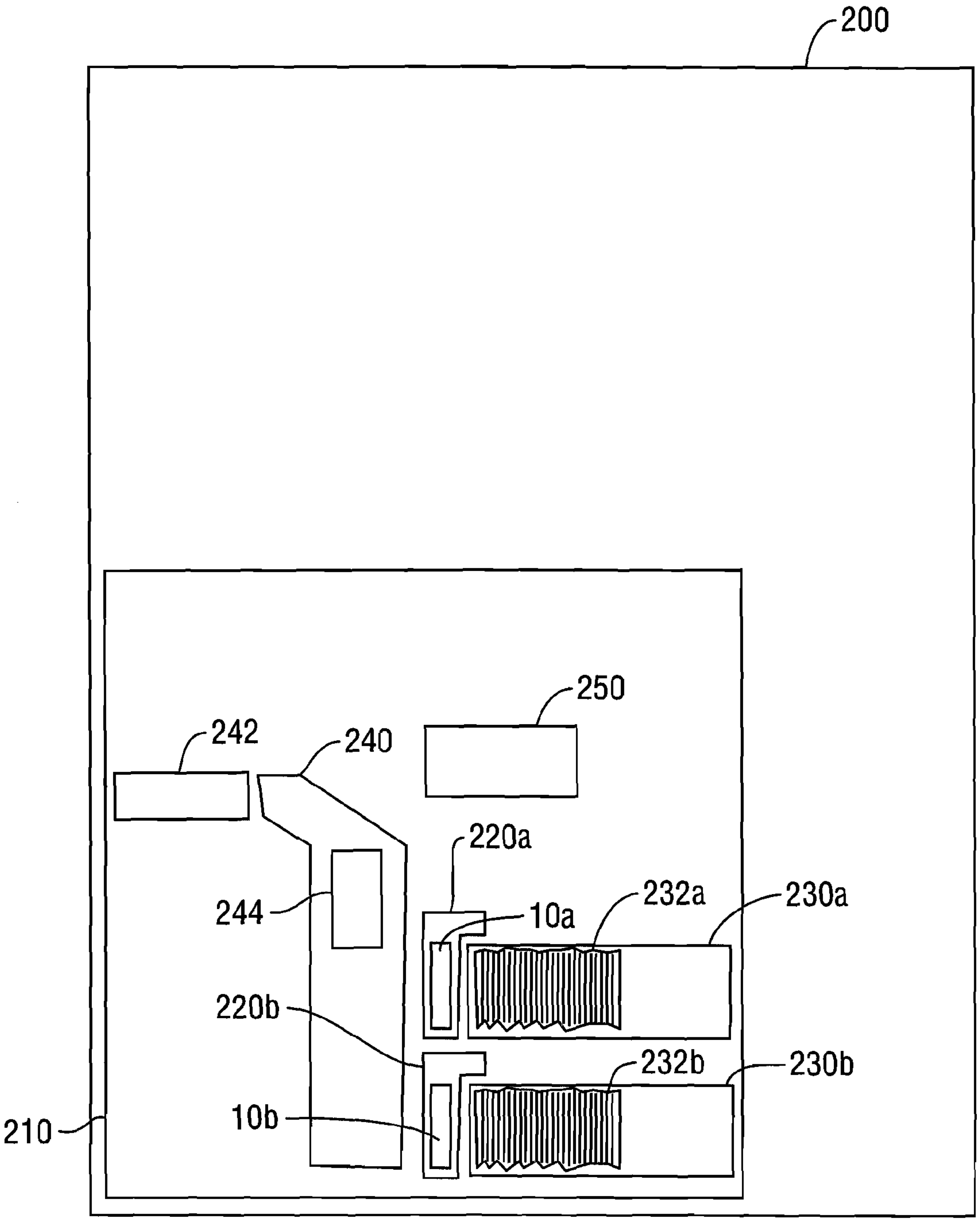
FIG. 5 is a simplified block diagram of a self-service terminal including a plurality of the optical sensors of FIGS. 1 to 4.

Reference will now also be made to FIG. 5, which is a simplified block diagram of a self-service terminal 200, in the form of an ATM. The ATM includes a cash dispenser 210 comprising two pick units 220*a,b*, each associated with a removable currency cassette 230*a,b*. Each pick unit 220 includes an optical sensor 10*a,b* for ascertaining the number of media items (in the form of banknotes) picked by its associated pick unit 220. As is known in the art, the currency cassettes 230 each contain a block 232*a,b* of individual banknotes for removal on a per banknote basis.

A transport mechanism 240 is provided for transporting picked banknotes from the currency cassettes 230 to a banknote stacker and presenter 242. The transport mechanism 240 includes a non-optical note thickness sensor (NTS) 244 (in the form of an LVDT sensor).

A dispenser controller 250 is provided to control the optical sensors 10, the pick units 220, the transport mechanism 240, the banknote stacker and presenter 242, and the LVDT sensor 244.

In this embodiment, each cassette 230 stores a different banknote denomination: cassette 230*a* stores twenty dollar bills, cassette 230*b* stores ten dollar bills.

One of the main reasons for having an NTS is that multiple items may be picked in a single pick operation and then transported superimposed on each other as a single item. The phrase "picked item" will be used herein to denote the result of a pick operation. A "picked item" may comprise one, two, three or more media items (banknotes in this example) superimposed and transported as a single item. The purpose of the optical sensors 10*a,b* is to ascertain how many media items (banknotes) are present in a picked item. This is achieved in this embodiment by recording a count reached for each picked item and comparing this count with a count expected for one, two, three, or more banknotes superimposed on each other.

The operation of the ATM 200 will now be described with particular reference to the optical sensors 10 (FIGS. 1 to 5 will be referred to in the description that follows).

Prior to dispensing a banknote from cassette 230*a*, the dispenser controller 250 instructs the first optical sensor 10*a* to take a null reading (that is, a reading without any media items present in the transport path 16. The dispenser controller 250 sends this instruction via the remote connectors 48.

On receipt of this instruction, the controller 42 initiates the counter 22 by driving a low signal on the opacity_start connection 46. This initialises the control circuitry 60. In particular, this drives a low signal (inactive) on the data_write connection 102, a high signal (inactive) on the opacity_ready connection 104 and a low signal (active) on the enable_counter connection 106.

The low signal on the enable_counter connection 106 causes the counter 22 to increment initially at a rate of 1 MHz due to the variable clock output 88 since the three most significant bits on the counter bus 62 are set to zero. The counter counts from zero (000H).

The resistor ladder 70 ensures that the voltage applied to the counter_voltage connection 74 rises proportionally to the count of the counter 22; two of these values are shown in Table 3.

TABLE 3

| Counter Value | Counter_Voltage |
|---|---|
| 000H | 0 V |
| 080H | 0.825 V |
| 3FFH | 1.65 V |

The voltage on the counter_voltage connection 74 is input to the voltage to current converter 26, which drives a current through the light source 14 proportional to the voltage on the counter_voltage connection 74. Since there is no media item present in the transport path 16, the optical receiver 20 will quickly detect the light emitted from the light source 14 (for example, when the counter reaches 010H), causing the comparator 32 to switch states. As a result, an active high signal is generated on the picksen_tripped connection 130. This causes the counter 22 to stop counting (that is, to freeze the value on the data bus 62). It also causes the delay circuit 112 to increment, which ripples through the inverters 110 to the flip-flops 100, driving a high signal (active) on the data_write connection 102, a low signal (active) on the opacity_ready connection 104 and a high signal (inactive) on the enable_counter connection 106.

The active signal on the data_write connection 102 has the effect of causing the flip-flop circuits 40 to read in the current value of the counter on the data bus 62.

The active signal on the opacity_ready connection 104 indicates to the controller 42 that the current value on the flip-flop circuits 40 should be read in via data bus 44.

The inactive signal on the enable_counter connection 106 clears the counter 22 resetting the count to zero.

The controller 40 then transmits the counter value read from the flip-flop circuits 40 to the dispenser controller 250 via the remote connectors 48.

The dispenser controller 250 uses the transmitted counter value (010H in this example) as a null value to offset future readings. The dispenser controller 250 also records a null value reading for the second optical sensor 10*b* in the same way as described above for the first optical sensor 10*a*.

When banknotes are to be dispensed, for example, to fulfil a cash dispense transaction, the dispenser controller 250 instructs the pick units 220*a,b* to pick the required number of banknotes. These banknotes are picked individually and conveyed to the transport mechanism 240 for delivery to the banknote stacker and presenter 242 (as is known in the art).

In addition to instructing the pick units 220 to pick the required number of banknotes, the dispenser controller 250 also instructs the controller 40 in each optical sensor 10*a,b* to take a plurality of opacity measurements for each banknote picked.

In this embodiment, the controller 40 takes multiple readings (approximately one reading every millisecond) across a picked item as the picked item is being transported. These readings are then averaged by the dispenser controller 250 and the null value is subtracted from the average reading to produce a calibrated reading. The calibrated reading is then compared with expected readings for one, two, three or more superimposed banknotes, and the number of banknotes ascertained therefrom.

In the event that the counter 22 reaches the value 400H, then a high (active) signal is present on the saturation connection 64. This means that the light source 14 has not emitted sufficient light for the optical receiver 20 to reach even the lowest threshold (approximately 0.75V). In practice, this could mean that the banknotes are highly opaque or that too many banknotes were picked as a picked item.

The result of a high signal on the saturation connection 64 is to stop the counter 22 from incrementing (that is, to freeze the value on the data bus 62). It also causes the delay circuit 112 to increment, which ripples through the inverters 110 to the flip-flops 100, driving a high signal (active) on the data_write connection 102, a low signal (active) on the opacity_ready connection 104 and a high signal (inactive) on the enable_counter connection 106.

The active signal on the data_write connection 102 has the effect of causing the flip-flop circuits 40 to read in the current value of the counter on the data bus 62.

The active signal on the opacity_ready connection 104 indicates to the controller 42 that the current value on the flip-flop circuits 40 should be read in via data bus 44.

The inactive signal on the enable_counter connection 106 clears the counter 22 resetting it to zero.

The controller 40 then transmits the counter value read from the flip-flop circuits 40 to the dispenser controller 250 via the remote connectors 48.

The dispenser controller 250 recognises that the saturation condition was reached without sufficient light being detected by the optical receiver 20, so the dispenser controller 250 may send the picked item to a purge bin (not shown) within the cash dispenser 210.

In the event that the counter 22 reaches a value indicative of a single banknote, the dispenser controller 250 transports the picked item to the LVDT sensor 244. This LVDT sensor 244 takes a reading of the picked item thickness using physical displacement, and relays this reading to the dispenser controller 250. If this reading is also indicative of a single banknote, then the picked item can be transported to the banknote stacker and presenter 242 for delivery to a customer of the ATM. This has the advantage that an optical system (the optical sensor 10) is used in addition to a mechanical system (the LVDT sensor 244) to ascertain the number of banknotes transported as a picked item. This reduces mistaken readings due to dirt, tape, or other contaminants on a banknote.

The low cost of the optical sensor 10 means that it can be economically incorporated within a pick module.

Various modifications may be made to the above described embodiment within the scope of the invention, for example, in other embodiments, a light source other than an IR LED may be used. In other embodiments, a different type of variable clock may be used. The component types described above are for illustration only—different parts could be used to achieve the same result.

In other embodiments, a media handler other than a cash dispenser may be used, for example, a ticket dispenser.

The steps of the methods described herein may be carried out in any suitable order, or simultaneously where appropriate. The methods described herein may be performed by software in machine readable form on a tangible storage medium or as a propagating signal.

The terms "comprising", "including", "incorporating", and "having" are used herein to recite an open-ended list of one or more elements or steps, not a closed list. When such terms are used, those elements or steps recited in the list are not exclusive of other elements or steps that may be added to the list.

What is claimed is:

1. An optical sensor comprising:

a light source located on one side of a transport path;

a variable current drive for energising the light source such that light intensity from the light source increases with increasing current, the variable current drive including (i) a drive circuit for applying a pulse of current to the light source, during which pulse the light source is energised; and (ii) a counter for increasing the amount of current applied by the drive circuit during a pulse of current;

an optical receiver in communication with the variable current drive, and located on an opposite side of the transport path to the light source and aligned therewith to detect light output therefrom; and a memory coupled to the variable current drive and arranged to store a value from the counter indicative of a number of media items present in the transport path.

2. An optical sensor according to claim 1, wherein the light source comprises one or more light emitting diodes (LEDs).

3. An optical sensor according to claim 1, wherein the optical sensor includes a comparator for comparing light detected by the optical receiver with a detected light threshold, such that when an intensity of light equal to the detected light threshold is reached, the variable current drive terminates the pulse of current.

4. An optical sensor according to claim 1, wherein the drive circuit includes a resistor ladder at the output of the counter so that as the counter value increases a rising linear voltage is output from the resistor ladder.

5. An optical sensor according to claim 1, wherein one of the bits of the counter is used as a saturation flag to indicate that the current cannot be increased any further and to terminate the pulse of current.

6. An optical sensor according to claim 4, wherein the drive circuit includes a voltage to current converter for converting an output voltage from the resistor ladder to a current for driving the light source.

7. An optical sensor according to claim 1, wherein a differential amplifier is coupled to the drive circuit so that an increasing input voltage is converted into a falling detected light threshold for the optical receiver.

8. An optical sensor according to claim 1, wherein the variable current drive further comprises a variable clock so that a slow clock rate is used when the counter has a low value, and a faster clock rate is used when the counter has a higher value.

9. A self-service terminal comprising: a pick unit incorporating the optical sensor of claim 1; and a non-optical sensor located in a transport path so that a number of media items picked by the pick unit is ascertained by the optical sensor and validated by the non-optical sensor.

10. A method of sensing media using an optical sensor, the method comprising:

applying a pulse of current to a light source to energise the light source;

incrementing a counter while the pulse is being applied to increase the amplitude of the current delivered by the pulse;

detecting an intensity of light received by an optical receiver separated from the light source by one or more media items in a transport path;

comparing the detected intensity with a threshold;

halting incrementing of the counter when the detected intensity reaches the threshold; and ascertaining a number of media items present in the transport path based on the value of the counter when halted.

11. A method according to claim 10, wherein the method comprises the further step of decrementing the threshold when incrementing the counter.

12. A method according to claim 10, wherein the step of incrementing the digital counter is implemented using a variable clock, so that as the counter increases the clock rate increases.

* * * * *